United States Patent [19]
Beeteson et al.

[11] Patent Number: 5,835,080
[45] Date of Patent: Nov. 10, 1998

[54] TOUCH SENSITIVE DISPLAY

[75] Inventors: John Stuart Beeteson, Romsey; Adrian Mark Clitheroe, Titchfield Common; Griffith John Lewis, Horton Heath; Edward Trevor Shepherd, Winchester, all of United Kingdom

[73] Assignee: International Business Machines Corporation, Armonk, N.Y.

[21] Appl. No.: 883,939

[22] Filed: May 12, 1992

Related U.S. Application Data

[63] Continuation of Ser. No. 618,860, Nov. 28, 1990.

[30] Foreign Application Priority Data

Nov. 30, 1989 [GB] United Kingdom .................... 8928557

[51] Int. Cl.⁶ ......................................................... G09G 5/00
[52] U.S. Cl. ............................................................. 345/173
[58] Field of Search ........................... 340/712; 200/572; 178/18; 345/173, 176

[56] References Cited

U.S. PATENT DOCUMENTS

| | | | |
|---|---|---|---|
| 4,511,760 | 4/1985 | Garwin et al. .......................... | 178/18 |
| 4,680,429 | 7/1987 | Murdock et al. ....................... | 340/712 |
| 4,746,914 | 5/1988 | Adler ....................................... | 340/712 |
| 4,816,811 | 3/1989 | Bogatin et al. ......................... | 340/712 |
| 4,958,148 | 9/1990 | Olson ...................................... | 340/712 |

FOREIGN PATENT DOCUMENTS

| | | | |
|---|---|---|---|
| 0256251 | 2/1988 | European Pat. Off. ....... | G06K 11/06 |
| 8504740 | 10/1985 | WIPO ............................ | G06K 11/06 |

*Primary Examiner*—Amare Mengistu
*Attorney, Agent, or Firm*—Edward H. Duffield; John J. Timar

[57] ABSTRACT

A touch screen display is presented which comprises a display screen, a plate of a rigid transparent material, mounting apparatus for mounting the plate on the display screen, touch sensing transducers cooperating with the mounting apparatus for producing a plurality of electrical signals in response to, and representative of, a force applied to the plate; the force results from tactile stimulus of the plate while the mounting apparatus includes a film composed of a transparent, elastic, adhesive compound, having a similar refractive index to that of the display screen; the adhesive compound being applied to one surface of the plate for bonding that surface to the display screen.

10 Claims, 2 Drawing Sheets

TOUCH SENSITIVE DISPLAY

This application is a continuation of Ser. No. 07/618,860, filed Nov. 28, 1990.

FIELD OF INVENTION

The present invention relates to a display. More specifically, a touch sensitive display comprising a push plate responsive to touch stimuli bonded to a display screen by a transparent adhesive elastic compound.

BACKGROUND OF INVENTION—PRIOR ART

A common example of a display screen for use in a touch sensitive display is a cathode ray tube (CRT). Additional apparatus is attached to the CRT for detecting touch stimuli. It is common for such a display to be part of a computer system responsive to instructions issued by touch stimuli. To date, touch sensitive displays have been implemented using a variety of different technologies for detecting such touch stimuli. In one such technology, a transparent overlay is placed over a CRT screen. The overlay contains an array of sensors which can be either resistive, conductive or capacitive. The sensors are arranged in rows and columns spanning the CRT screen area; each sensor therefore corresponding to a particular screen loction. A signal from one such sensor is therefore indicative of a particular touch location. However, such sensors can be visible and may therefore obscure from view, any image displayed on the display. Furthermore the such sensor materials are often fabricated on a wafer-like substrate and are therefore very fragile.

Another technology involves the processing of an optical signal scanned across a CRT screen in order to determine a touch location. Such techniques have problems associated with optical parallax. The optical signal can also be obscured from detection by foreign bodies in the vicinity of the CRT screen.

Another technology involves an array of force sensitive transducers which are mounted around the periphery of a CRT screen. Each transducer generates a different signal upon receiving a touch stimulus. The relative magnitudes of these signals can then be used to determine a touch location. A problem with this arrangement is that the force transducers are sensitive to spurious vibrations of the display. Furthermore the force transducers are additionally exposed to any out of balance forces which can be generated in the CRT construction itself during assembly of the display. Such undesirable effects can be reduced in a similar arrangement in which the array of force transducers around the periphery of a transparent push plate which is shaped to match the contours of, whilst not making contact with the CRT screen. A disadvantage with this arrangement is that a optical parallax caused by the push plate raised above the CRT screen. Another problem related to this arrangment is that of internal reflections occurring between the CRT screen and the push plate. Furthermore, this arrangement should comprise push plate mountings which are resilient enough to withstand repeated touch operations as part of a normal product lifetime, yet not so rigid as to limit movement of the push plate relative to the CRT screen.

EP 256 251 describes a touch sensitive display having a push plate arrangment similar to the latter described above. The touch sensitive screen assembly comprises a frame with openings to align with mounting brackets extending from a display screen such as a CRT. The frame supports a rigid transparent push plate facing the display. An array of force sensitive transducers are mounted on the push plate surface facing the display. The touch screen assembly is held in position via deformable members which connect to both the openings on the frame and the brackets on the display output device. Use of such deformable members solves the problem of maintaining measurement repeatability during the normal lifetime of the display. However, the deformable members are large in comparison with conventional screw and receptacle arrangements provided for mounting CRTs into bezels. In addition, and in common with those touch screen displays using force sensitive tranducer arrays described in the previous paragraph, this arrangement can be sensitive to vibrations of the display and therefore complex electronic signal processing is required for conditioning the signals from the transducers. In general, interferance from such vibrational forces is more significant where the force transducers are arranged so as to bear the load of the display screen. In these circumstances, vibrations tend to move the display rather than the display screen.

OBJECT OF INVENTION

The aim of the present invention is therefore to provide a touch display arrangement which is not affected by vibrational forces, and further prevents optical problems arising from parallax and internal reflections.

BRIEF SUMMARY OF INVENTION

According to the present invention there is now proposed a display comprising a display screen, a plate of a rigid transparent material, mounting means for mounting the plate on the display screen, touch sensing means cooperating with the mounting means for producing a plurality of electrical signals in response to and representative of a force applied to the plate; said force resulting from tactile stimulus of the plate, characterised in that the mounting means comprises a film composed of a transparent, elastic, adhesive compound, having a similar refractive index to that of the display screen; said compound being applied to one surface of the plate for bonding that surface to the display screen.

This arrangement has the advantage that problems of parallax and internal reflection, which can occur in conventional force sensitive touch screen displays are overcome. Furthermore, no bias can be applied to the array via forces imposed during assembly of the display since the push plate is supported by the compound not by the transducers. In this arrangement the transducers are exposed to a much reduced mass in comparison with aforementioned arrangements where the transducers are supporting the whole display screen. This system is therefore much less sensitive to vibrations. Also, this arrangement enables the touch screen to be a compact sealed enclosure thereby simplifying the manufacture of the touch sensitive display. Where the display screen is a CRT, yet another advantage of this arrangement is that fragile and non abrasion-resistant coatings of the CRT screen such as those used to reduce electrostatic fields (ESF coatings) can be applied to the screen without the possibility of removal during life.

Preferably the viscosity of the compound is such as to prevent a net flow in volume of the film during the operational lifetime of the touch screen mounting assembly, while permitting a thickness of applied film to be sufficient for allowing the push plate to move both towards and away from the display. The advantage of this is that sensitivity of the touch screen remains uniform throughout the lifetime of the touch sensitive display. In addition, the film acts as a selective damping means which renders the touch screen immune from vibrations of the display.

A particularly preferred example of the present invention will now be described with reference to the accompanying drawings in which:

DETAILED DESCRIPTION OF PREFERRED EMBODIMENT

Figure 1:
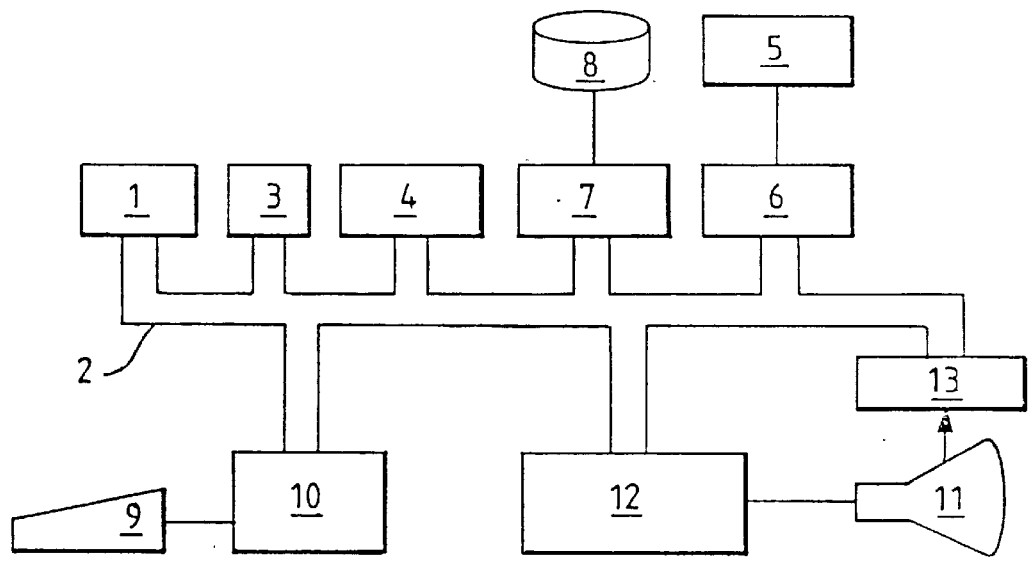
FIG. 1 is a block diagram of a computer system for responding to instructions selected by means incorporating the present invention.

The computer system shown in FIG. 1, which includes a touch sensitive display in accordance with the present invention shown in FIG. 1, will now be described. This computer system includes a central processing unit (CPU) 1 for executing program instructions. A bus architecture 2 provides a data communication path between the CPU and other components of the computer system. A read only memory 3 provides secure storage of data. A fast random access memory 4 provides temporary storage of data. Data communication with a host computer system 5 is provided by a communication adapter 6. An I/O adapter 7 provides a means for communicating data both to and from a mass storage device 8.

A user can operate the computer system using a keyboard 9 which is connected to the bus architecture via a keyboard adapter 10. A display 11 comprising a CRT, with a touch sensitive feature incorporating the present invention, provides a visual output from the computer system. The visual output is generated by a display adapter 12. The user can also operate the computer using the touch sensitive feature of the display which is connected to the bus architecture via a touch screen adapter 13.

The touch sensitive feature of the display in FIG. 1 is induced by a transducer arrangement which will now be described with reference to FIG. 2. This transducer arrangement comprises four force sensitive transducers 21,22,23,24 bonded to the four corners of a rectangular, transparent push plate 20. Four discrete electrical signals 25,26,27,28 are generated by the four transducers; each electrical signal being produced by a different transducer. The four electrical signals are separately processed by a signal conditioning and analog to digital (A to D) conversion 29 portion of the touch screen adapter shown in FIG. 1, 13. The signal conditioning and A to D conversion portion thus produces a binary data output 30 indicative of relative forces measured by the four transducers and therefore representative of a location on the display at which a touch stimulus is applied.

Figure 2:
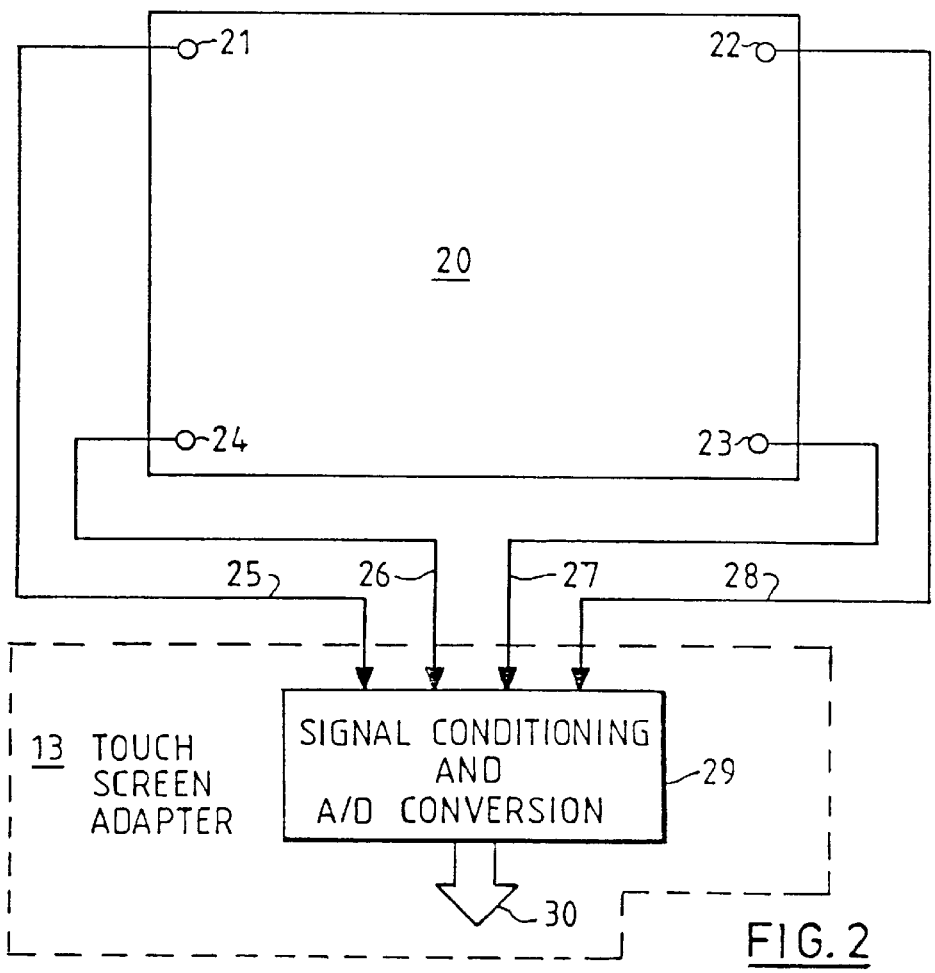
FIG. 2 is a block diagram of a transducer arrangement for the present invention.
Figure 3:
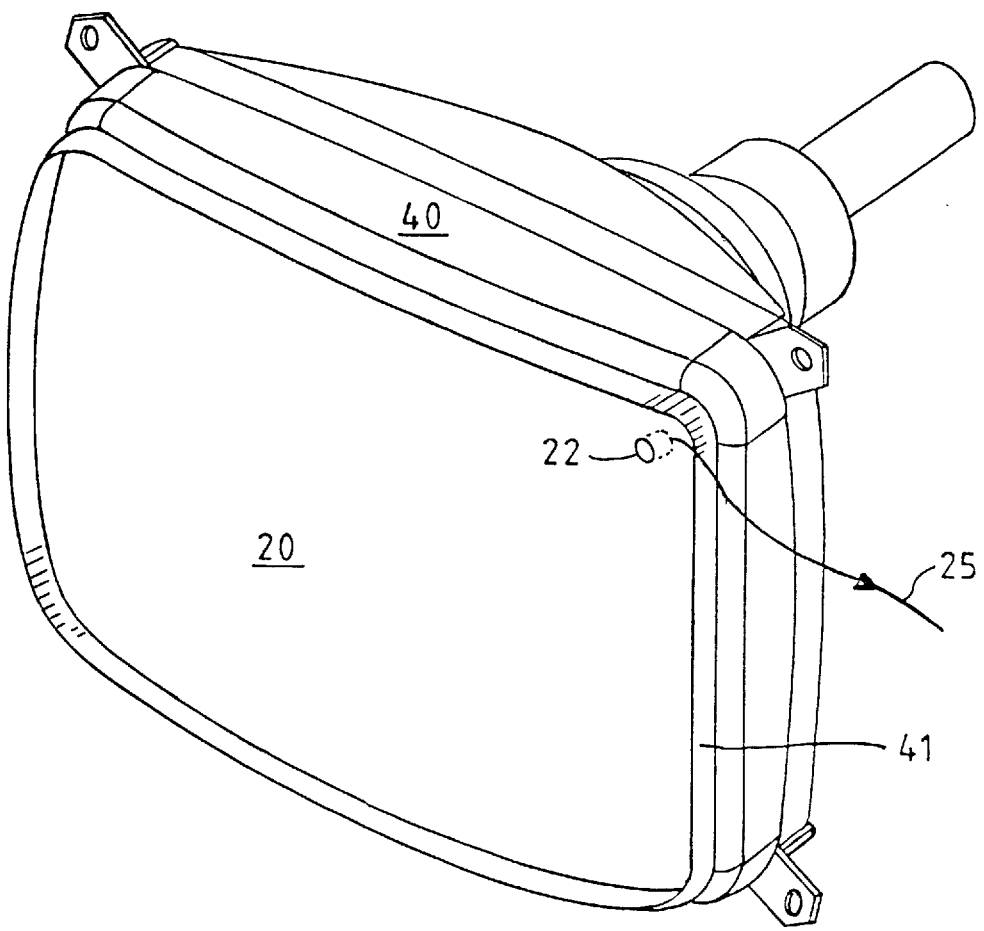
FIG. 3 is a perspective view of a CRT assembly onto the face of which a push plate is bonded in accordance with the present invention.

The transducer arrangement shown in FIG. 2 is mounted on the CRT in a touch screen mounting assembly arranged in accordance with the present invention. The touch screen mounting assembly will now be described with reference to the perspective view shown in FIG. 3. This diagram shows the corner of the display wherein the touch sensitive feature is dominated by electrical signal 25 generated by transducer 21 mounted on the push plate 20. The push plate is bonded to the face of the CRT 40 by a uniform layer of a adhesive, elastic, transparent compound 41 hereinafter referred to as gel. A commercially available example of such a gel is Sylgard (registered trademark) 527 A and B Silicone Dielectric Gel.

By way of an example of the present invention, a touch sensitive display comprising a Cathode Ray Tube has been described. However, it will be appreciated that the present invention can also be implemented in touch screen displays comprising other types of display screen. Examples of such display screens are Liquid Crystal Displays, and Plasma Panel Displays. Also, the example of the present invention shown in the diagrams has been described in relation to a tensile force measurement system whereby the associated deformation of the gel is normal to the display screen. It will be appreciated from the description of the example that the present invention is equally applicable to a torsional force measurement system for measuring slewing of the push plate relative to the display screen.

It will also be appreciated that, whilst an example of the present invention has been described with reference to a touch sensitive display comprising an array of piezoelectric force transducers, the present invention is not limited in application to this type of transducer alone. The present invention is equally applicable to touch sensitive displays comprising arrays of either conductive, resistive, or capacitive sensors as used in the aforementioned overlay technologies; therefore, what is desired to be protected by Letters Patent and what is claimed is:

We claim:

1. A display comprising a display screen, a plate of a substantially rigid transparent material, mounting means for mounting the plate on the display screen, force sensing transducer means receiving forces via the mounting means for producing a plurality of electrical signals in response to and representative of a force applied to the plate by a tactile stimulus of the plate, wherein:

said mounting means comprises a film composed of a transparent, elastic, adhesive compound, having a similar refractive index to that of the display screen; said adhesive compound being applied to one surface of said plate for bonding that surface to the display screen and transmitting said force applied to said force sensing transducer means.

2. The display as claimed in claim 1, wherein:

said adhesive compound is of a viscosity which prevents a net flow of volume of the film during the operational lifetime of the display.

3. The display as claimed in claim 2, wherein:

said film is of a thickness which is resistant to a permanent set from repeated tactile stimulus of the plate.

4. The display as claimed in claim 3, wherein:

said film is of sufficient thickness to allow movement of said plate both sufficiently towards and sufficiently away from said display screen in response to tactile stimuli and for registration of such tactile stimuli by said force sensing transducer means.

5. The display as claimed in claim 4, wherein:

said force sensing transducer means comprises an array of force sensitive transducers.

6. The display as claimed in claim 5, wherein:

said adhesive compound is a silicone dielectric gel.

7. The display as claimed in claim 6, wherein:

said gel is a copolymer of first and second compounds.

8. The display as claimed in claim 7, wherein:

said array of force sensitive transducers are arranged to detect tactile stimuli by receiving forces via tensile stressing of said gel.

9. The display as claimed in claim 7, wherein:

said array of force sensitive transducers are arranged to detect tactile stimuli by receiving forces via torsional stressing of said gel.

10. In a display comprising a display screen, a method for electrically detecting a tactile stimulus comprising, mounting means comprising a film composed of a transparent, elastic, adhesive compound, having a similar refractive index to that of said display screen; and a plate of a substantially rigid transparent material on the display screen; said adhesive compound being applied to one surface of said plate for bonding that surface to said display screen, and force sensing transducers receiving forces via said mounting means for producing a plurality of electrical signals in response to, and representative of, a force applied to said plate by the tactile stimulus of said plate.

* * * * *